Patented Dec. 7, 1937

2,101,472

UNITED STATES PATENT OFFICE 2,101,472

ANTIFREEZING MEANS

Frederick A. Kormann, Glendale, Calif.

No Drawing. Application November 20, 1934,
Serial No. 753,904

3 Claims. (Cl. 134—27)

This invention relates to a method and a composition of matter for preventing the formation or adhesion of ice on exposed surfaces, and has as its primary object the provision of a means and a method for treating the surfaces of objects exposed to minimum or freezing temperatures so as to prevent the formation or accumulation of ice thereon.

Another object is to provide a means and method of the above character which is applicable to various materials such as wood, metal, fabric, glass and other solids including compositions, and which is also applicable to surface coatings, such as paints, varnishes, lacquers, enamels and the like; which will not result in injury or damage to the materials treated, which will not detract from the appearance of the surface to which it is applied, and which will add but little weight to the object on which it is employed.

Another object is to provide a means and method for treating surfaces to prevent the formation, or adhesion, or accumulation of ice thereon, which involves the employment of a substance which may be applied to the surface under treatment to afford a coating therefor, in which the coating may be applied in a fluid state, as by dipping, spraying or brushing operations.

Another object is to provide a means and method for treating a surface which will render the treated surface immune to ice for a protracted period of time, and which is of such nature as not to preclude the employment of repeated applications of the materials.

A further object is to provide a means and method of the above character which is especially applicable to the treatment of exposed surfaces of airplanes and particularly to the wing structure thereof to inhibit the adhesion of ice and snow thereon.

In carrying out one form of the invention, I provide a gelatinous glycerol or glycolic mass the base of which consists of gelatine, with or without other glutinous matter, to which is added an anti-freeze substance of the glycerol or glycolic type, such as glycerine or ethylene glycol, used singly or collectively, and to which mass may be added a toughening agent such as casein, a preservative such as sodium benzoate, and in some instances a material which will render the gelatine less soluble in water, such as tannic acid, alum, dichromate, etc. Another form of the invention will be defined hereinafter.

In forming the mixture the several ingredients are preferably employed in the proportions of two pounds of anti-freeze matter consisting either of glycerol, or ethylene glycol, or a mixture of glycerol and glycol, and one pound of gelatinous adhesive preferably composed of three-fourths pound of gelatine and one-fourth pound of glue. The above stated proportions expressed in parts by weight, is accordingly eight parts glycerol or glycol, and four parts gelatinous adhesive composed of three parts gelatine and one part glue.

When casein is added to the mixture, one-eighth pound or one-half part thereof is employed with the proportions above stated, and where sodium benzoate is used as a preservative it is employed in the proportion of approximately one-tenth of one per cent by volume of the mass. In instances where it is desirable to render the gelatine less soluble in water, about one-tenth per cent to ten per cent of tannic acid, alum, or dichromate, or other similar substance is added to the gelatine.

While definite proportions of the several substances are herein set forth, it is to be understood that such proportions are given by way of example, since they have proven highly satisfactory in accomplishing the desired results, but inasmuch as employment of the various substances in approximately the proportions stated and also within a considerable range of variation may also give satisfactory results in some instances, I do not limit myself, nor is the invention herein set forth to be construed as being limited to the exact proportions above stated.

For example, the amount of glue relative to the quantity of gelatine used may be increased or diminished according to the quality of the glue and gelatine employed and also to vary the adhesive properties of the product, and in some instances glue may be dispensed with as where gelatine having sufficient adhesiveness is employed and particularly where the gelatine is treated to render it less soluble in water, as above stated. Likewise the proportion of the anti-freeze constituent may be increased or diminished relative to the gelatinous adhesive base to increase or decrease the anti-freeze properties of the mixture as occasion may require. In like manner, the amount of casein may be varied to regulate the degree of toughness of the mass.

In forming the mixture with glue, the glue is melted in the usual manner; the gelatine being added to the glue, and the mixture heated to bring it to a liquid state. Dry white glue and the ordinary sheet gelatine of commerce are preferably used.

Where glue is dispensed with the gelatine, employed either alone or with its anti-soluble forming constituent, is heated and brought to a liquid state.

The anti-freeze constituent, either glycerol or glycol, or both, with or without a toughening agent, such as casein, and with or without a preservative, such as sodium benzoate, is added to the hot liquefied glue and gelatine or liquefied gelatine, and thoroughly intermixed therewith. The resultant mixture forms a compact, tenacious, gelatinous mass when cold or set, which mass is readily liquefied by the action of heat. The mixture is applied while in its hot liquid state, either when freshly made or by remelting after it has been allowed to cool.

Where a preservative is added, the mass will keep in its cold state a protracted period of time, and especially when enclosed in hermetically sealed containers.

The functions of the several ingredients are as follows:

The gelatine is employed as an adhesive and as a medium of suspension for the glycerol or glycol, or glycerol and glycol, while the glycerol or glycol or glycerol and glycol mixture acts as an anti-freeze agent. The glue content imparts adhesiveness to the mass, and casein where employed serves the purpose of toughening the mass and together with or without tannic acid, alum or dichromate where such substances are used retards leaching of the applied mixture under high humidity.

In carrying the method into effect, the anti-freeze mixture as above set forth is applied to the surface to be protected, while in a liquid state, either by dipping the object to be coated in the liquid, or by applying the liquid to the surface thereof as by means of brushing or spraying; the mixture on cooling to normal atmospheric temperatures forming a film on the surface to which it is applied of solid, tenacious, gelatinous character, which in a thin coating resists displacement but which is subject to being removed from smooth surfaces as by scraping or peeling.

It has been found in practice that satisfactory results are obtained by applying a thin coating of the materials to a surface, but manifestly any desired thickness of the mixture may be employed as occasion may require, it being desirable to build up such thickness by application of successive coats of the mixture in liquid form.

The resultant surface coating is characterized by the quality of gradually giving up the glycerol or glycol content to its surface thus maintaining an anti-freeze substance on and throughout its surface until the anti-freeze agent has been leached or otherwise removed or dissipated. During such time as the anti-freeze agent remains on the film surface, the adhesion of ice and its accumulation on the surface is prevented. In this manner the formation of ice on any solid surface and the clinging and accumulation of ice thereon may be inhibited.

While the invention is subject to numerous uses and applications, it is especially applicable and is highly advantageous in preventing the formation of ice and deposits thereof on the surfaces of airplanes, especially on the wing structure, and particularly on the leading edges of the wings, since in the operation of airplanes where flying in conditions of minimum temperatures and humidity such as to result in accumulations of ice on the airplane wings, is highly hazardous, and frequently results in disaster due to the destruction of the airfoil contours essential to sustained flight as well as to the added weight and loss of balance. By applying a coating of the anti-freeze composition to the surfaces of the airplane, the formation and accumulation of ice on such coated surfaces will be inhibited for a considerable period of time. This period of time, however, will be shortened where the surface is exposed to intensive leaching action.

The coating of the anti-freeze composition conforms to the contours of the surface to which it is applied and accordingly effects no change in the airfoil formation of an airplane wing surface coated therewith, and furthermore being applied in a thin coating adds no appreciable load to the structure. The applied surface coating is transparent and accordingly does not materially change the color appearance of the coated structure.

The anti-freeze ingredient exuding from the surface of the composition acts to prevent accumulation of ice and snow deposited thereon, especially while the airplane is in flight, since the anti-freeze substance prevents adhesion of ice or snow to the surface coated therewith.

Manifestly in the progress of an airplane in flight the air currents flowing over and impinging on the leading edge and top surface of the treated wing will act to immediately dislodge any ice or snow particles as may be deposited on such surface by reason of their non-adhesion therewith.

The anti-freeze coating will be subjected to a leaching action when exposed to high humidity and especially when the airplane is flying through fog, mist, or rain, which action effects removal and dissipation of the exuded anti-freeze constituent from the surface of the coating but such removed matter is replenished by that within the body of the coating until the anti-freeze content is exhausted. However, a single treatment of the airplane surface by this invention will endure for a period of several hours under severest weather conditions, which is amply sufficient to admit of the airplane being operated either to avoid the depressed zone or to effect landing at its destination before the anti-freeze effect of the coating is neutralized or rendered ineffectual.

When a coating has been rendered inert or ineffective, a second coating may be applied thereover and in some instances a series of coatings may thus be applied to the surface under treatment from time to time as occasion may require to reestablish the anti-freeze action. However, where it is necessary or desirable to remove the coating, such may be readily effected by application of sufficient heat to the coating to permit its being either removed by brushing or washing. Application of warm water is ordinarily effective for the purpose.

The invention is also applicable for use on surfaces of other vehicles, such as automobiles, trains, ships, etc., and is especially valuable in the treatment of hawsers, winches, and other equipment of marine vessels to afford protection against the accumulation of ice.

The invention is also serviceable in effecting de-icing of refrigerant conduits in refrigerators, since by coating such conduits with the anti-freeze material the formation and accumulation of ice thereon will be prevented, thus increasing the refrigerating efficiency of such conduits.

Furthermore, by coating the surfaces of trays, tanks and other liquid containing vessels in which ice is to be formed by freezing the water content thereof, the formed ice will not cling to the walls of the vessel and accordingly may be readily removed therefrom.

Similar results may be obtained without intermixing of the liquid gelatinous adhesive and the anti-freeze constituent and accordingly the invention embraces a second or alternative form of application which consists in initially applying to a surface to be treated, a coating of the anti-freeze substance, as by means of a brush, spray, or by dipping, and thereafter applying a coating of the liquid gelatinous adhesive as by means of a spray, to form a binder for the anti-freeze material through which the latter may work to the exposed surface to maintain a coating of the anti-freeze material thereon.

In this fashion, the anti-freeze material may be prepared independently of the gelatinous adhesive and vice versa, and the two materials may be maintained separated until their application to the surface to be treated is desired. This alternative mode of application may be extended by forming a series of alternate layers of the anti-freeze material and the binder material with the final coating consisting of either one or the other of such materials.

I claim:

1. A surface coating for preventing the adherence of ice consisting of glycerol, and a collagenous material in the approximate proportions of eight parts of the glycerol and four parts collagenous material, said coating being characterized by having the property when applied of exuding glycerol.

2. An anti-freezing surface coating consisting of glycerol, gelatine, and glue in the proportions of approximately eight parts glycerol, three parts gelatine, and one part glue, said coating being characterized by having the property when applied of exuding glycerol.

3. A surface coating for preventing the adherence of ice consisting of glycerol, gelatine, and glue in the proportions of two pounds of glycerol, approximately three-fourths pound gelatine, one-fourth pound of glue, and one-eighth pound of casein, said coating being characterized by having the property when applied of exuding glycerol.

FREDERICK A. KORMANN.